United States Patent

Ewald et al.

[15] 3,672,274

[45] June 27, 1972

[54] ASSEMBLAGE AND PACK FOR SELF-PROCESSING FILM UNITS

[72] Inventors: William P. Ewald; Hubert Nerwin; Donald M. Harvey, all of 901 Elmgrove Road, Rochester, N.Y. 14650

[22] Filed: Oct. 2, 1970

[21] Appl. No.: 77,502

[52] U.S. Cl............................................95/13, 95/19, 96/76
[51] Int. Cl.........................................................G03b 17/50
[58] Field of Search......................................95/13, 19; 96/76

[56] References Cited

UNITED STATES PATENTS 2,558,856  7/1951  Land..........................................96/76

Primary Examiner—Samuel S. Matthews
Assistant Examiner—Richard M. Sheer
Attorney—Robert W. Hampton and J. Addison Mathews

[57] ABSTRACT

An assemblage of self-processing film units and a film pack or magazine for containing such units. The assemblage includes a plurality of stacked film units each including a central portion of one thickness supporting photosensitive material, and end portion of another thickness supporting a trap or excess fluid collector, and another end portion of another thickness for supporting a rupturable pod. A reduction in the overall thickness of the stacked trap-end portions is accomplished by nesting each or most of the traps with the traps of the adjacent film units in the stack. The magazine is configured and adapted to house photosensitive portions of the stacked film units in a flat condition behind an exposure aperture, while the pod and trap portions are located at the ends of the magazine, only one end of which need be thicker than the central portion to receive the thicker pods.

4 Claims, 6 Drawing Figures

PATENTED JUN 27 1972 3,672,274
SHEET 1 OF 2
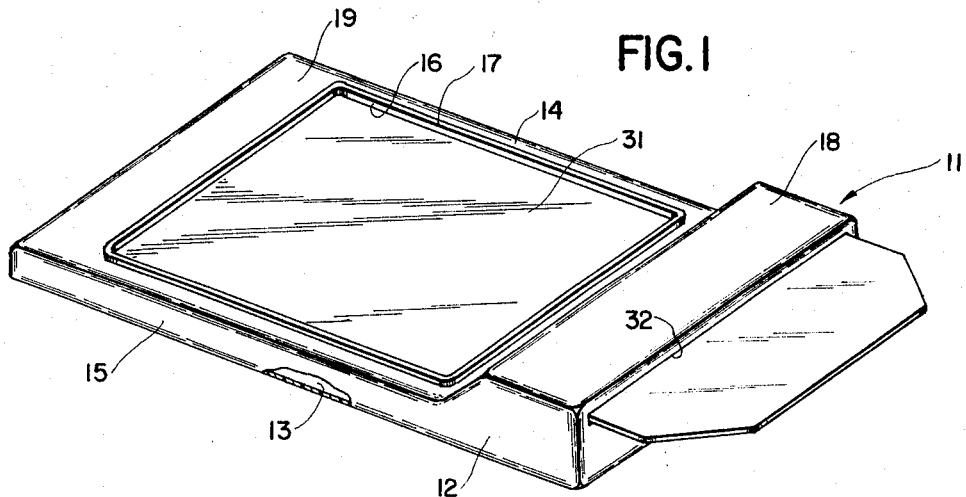
FIG.1
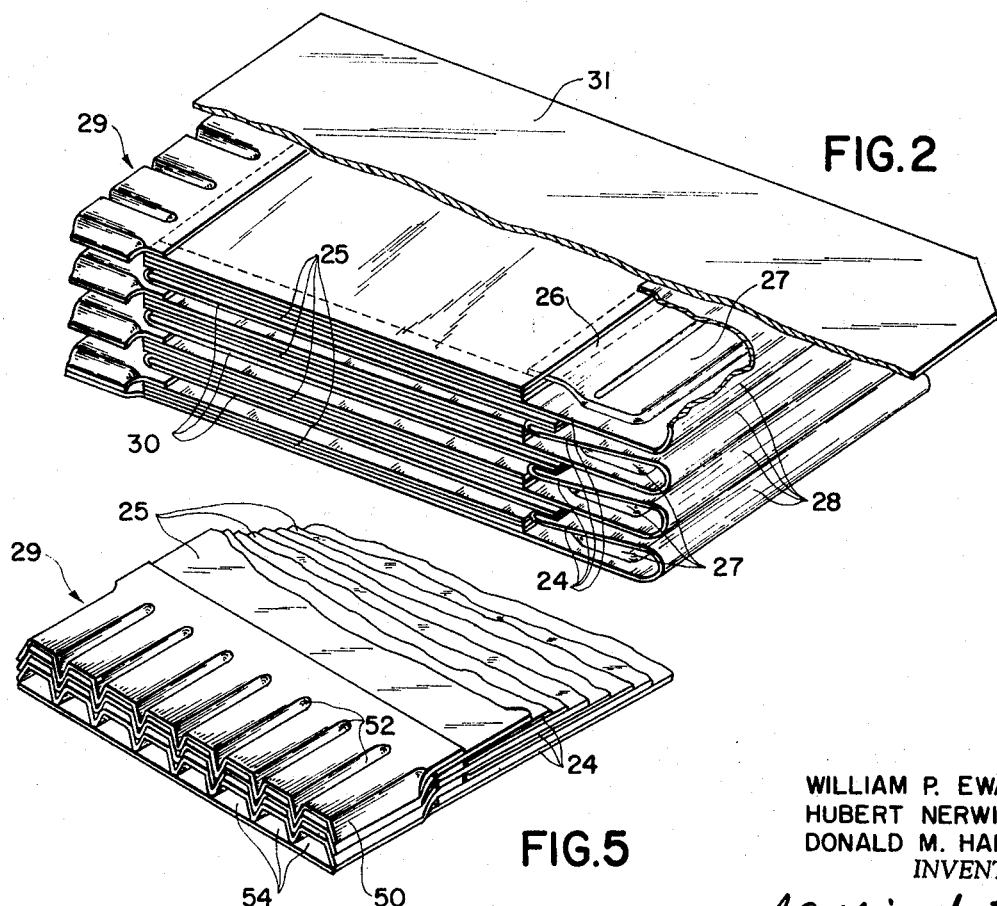
FIG.2
FIG.5
WILLIAM P. EWALD
HUBERT NERWIN
DONALD M. HARVEY
INVENTORS
BY J. Addison Mathew
Robert W Hampton
ATTORNEYS

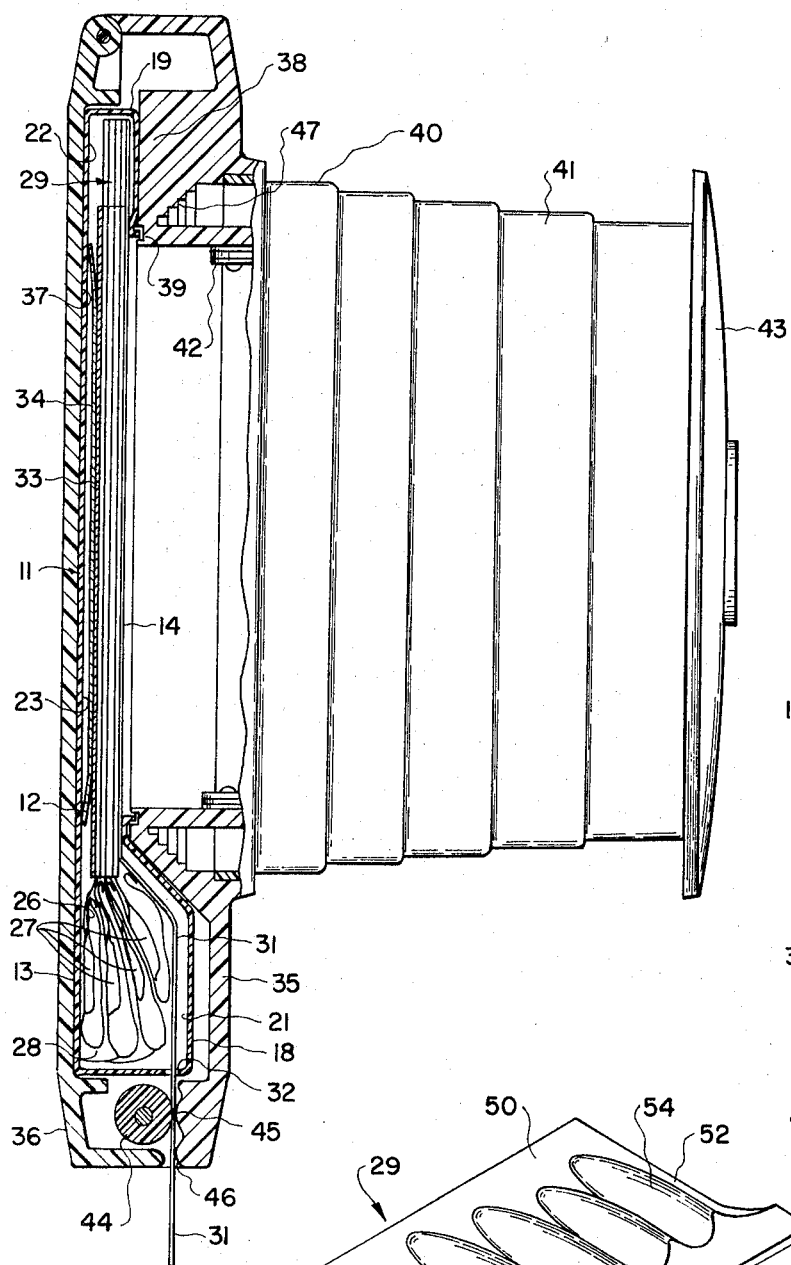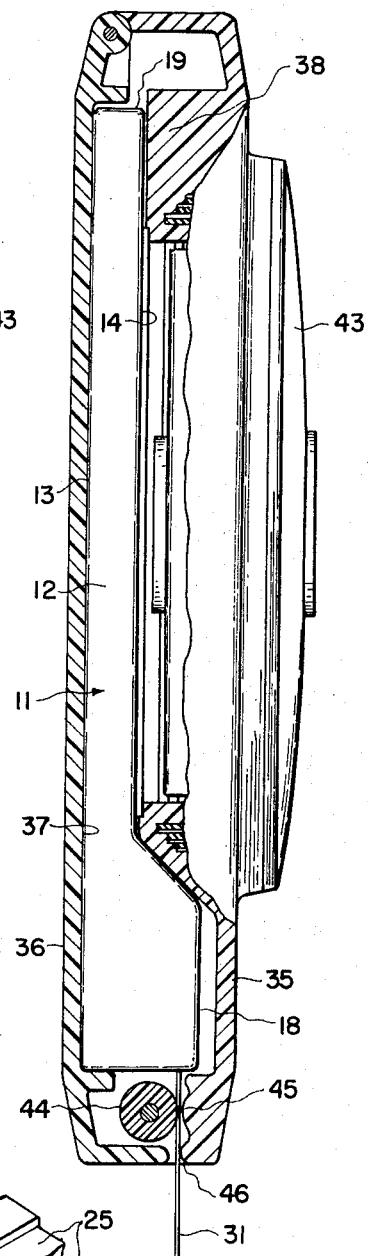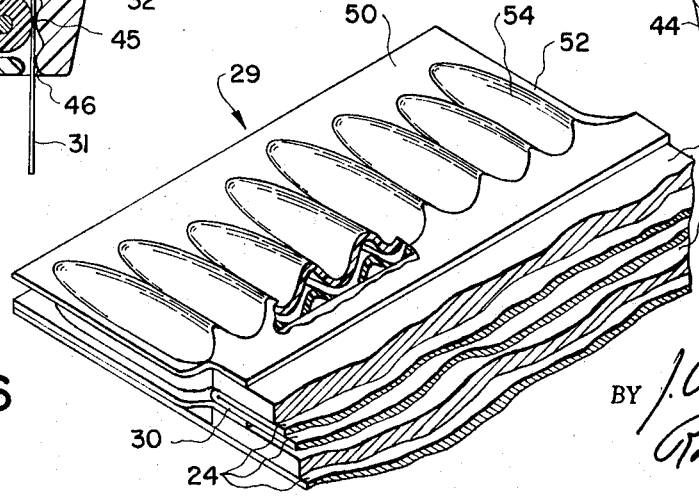

ASSEMBLAGE AND PACK FOR SELF-PROCESSING FILM UNITS

BACKGROUND OF THE INVENTION

1. Field of the Invention

The present invention relates to photography and more particularly to self-processing cameras and to film assemblages, packs and cartridges for use with such cameras.

2. Description of the Prior Art

Almost since the inception of amateur photography, the prevailing trend, made possible by improvements in lenses, film emulsions, etc., has been toward reducing the size of cameras, for example by effecting corresponding reductions in the film image-size or format. In recent years, however, one of the more popular innovations in amateur photography has been the self-processing camera, which, for reasons well known to those skilled in the art, necessarily requires a large film format and a relatively long focal length to provide a reasonably large finished print.

Presently, film packs adapted to be used with such cameras comprise a box-like casing of substantially uniform thickness having a flat forward wall member. Since the thickness of this pack is substantially uniform, and since the film units contained in the pack are thicker at the ends where fluid pods and traps are located, the entire length of the cartridge must be thick enough to accommodate the thickest portions of the units stacked on top of each other. One example of such film packs, having some elements similar to the present invention, is described in commonly assigned co-pending U.S. application Ser. No. 841,865 entitled "Liquid Trap Means for In-Camera Processed Photographic Product," filed in the names of Frost and Schieven on July 15, 1969.

The camera adapted to receive such box-like film casings, in its most compact form, usually is provided with a collapsible bellows or the like to accommodate in the extended position the relatively long focal length dictated by the large film format, and to overlie in the retracted position the forward wall member of the film casing. Accordingly, the overall thickness of the film pack must increase the thickness or forward-to-rearward size of the camera by an amount at least equal to the thickness of the pack, both when the shutter and lens assembly is extended and when it is retracted. Moreover, because of physical dictations of the system, the camera can never be thinner than the thickness of the pack plus the objective thickness in the axial direction.

SUMMARY OF THE INVENTION

It is an object of the present invention to overcome at least some of the problems associated with the miniaturization of assemblages, packs, and cartridges for self-processing film, at least in the thickness or front-to-back dimension, and to provide a relatively thin pack of the self-processing type.

It is a further object of the present invention to provide a film unit and an assemblage thereof wherein each or most of the units include a trap or excess fluid collector configured and arranged to nest with the traps of the adjacent film units to provide a thinner assemblage and pack or cartridge.

In a preferred embodiment of the present invention, an assemblage of stacked film units is provided wherein each unit includes a pod of processing fluid at one end and a trap or excess fluid collector at the opposite end. The image recording or photosensitive portions of the stacked film sheets are relatively thin and are housed in flat condition in a central compartment of a film pack or cartridge behind an exposure window. The pods are thicker than the photosensitive portions, and are received in an enlarged end compartment of the cartridge that extends forwardly from the central portion. The traps, on the other hand, that also are thicker than the photosensitive portions of the unit, are arranged and configured to mate or nest in stacked relation to provide a thinner pack at least at the trap end. In this manner the stacked and nested trap portions of the units may be made thinner than the combined thicknesses of the traps added individually.

Various means for practicing the invention and other advantages and novel features thereof will be apparent from the following detailed description of an illustrative preferred embodiment of the invention, reference being made to the accompanying drawings in which like reference numerals denote like elements.

BRIEF DESCRIPTION OF THE DRAWINGS

In the accompanying drawings:

FIG. 1 is a perspective view of a self-processing film pack and cartridge casing according to the present invention;

FIG. 2 is a perspective view, partially in section, of a film assemblage adapted to be incorporated into the cartridge casing shown in FIG. 1 to form the film pack;

FIG. 3 is a partially cross-sectioned side elevational view showing the film pack depicted in FIGS. 1 and 2 loaded into a camera according to the present invention;

FIG. 4 is a partially cross-sectioned view corresponding generally to FIG. 3 but showing the depicted camera with its lens and shutter assembly retracted;

FIG. 5 is a partial perspective view illustrating the interfitting or nesting traps in accordance with the present invention;

FIG. 6 is a partial perspective view corresponding to FIG. 5 but illustrating a different embodiment of trap.

DETAILED DESCRIPTION OF THE PREFERRED EMBODIMENT

As best shown in FIG. 1 of the accompanying drawings, a film pack or magazine 11, according to a preferred embodiment of the present invention, comprises a casing 12 having a relatively thin portion and a first end portion thicker than the central portion. The cartridge is specially configured in this manner to more efficiently contain an assemblage or plurality of film units that have a relatively thin central or photosenstive portion and a first end portion thicker than the central portion. However, as will become more apparent hereinafter, the film units include second end portions also thicker than the central portion, while the magazine casing receiving the units does not need a corresponding thickened second end portion because, in accordance with the present invention, it has been found possible to nest the trap end portions of the unit to provide a thinner assemblage.

In FIG. 1, the preferred cartridge is illustrated lying on its back or flat wall member 13, with a substantially flat front wall member 14, maintained in substantially parallel relation with the back wall member by supports such as side walls 15. This front wall member 14 is provided with a rectangular exposure window 16 surrounded by a forwardly projecting light sealing lip 17.

The cartridge is somewhat elongate, and has opposite ends 18 and 19 that define respective inner cartridge compartments 21 and 22, shown in FIG. 3. End 18 extends forwardly or away from back wall member 13, beyond the front wall member 14, to define a chamber 21 that is substantially larger in a forward-to-rearward direction than the central cartridge compartment 23 directly behind the front wall member 14.

By reference to FIG. 2, the film assemblage housed within the magazine casing will be seen to include four substantially identical film units 24, each of which comprises a laminated and integrally formed film member 25. The film units per se are disclosed more completely, for example, in commonly assigned copending U.S. Patent application Ser. No. 33,677 filed in the name of D. M. Harvey on May 1, 1970. Briefly, however, each of these illustrative film members comprises a first photosensitive sheet or element joined along its lateral edges to a transparent second or process sheet through which the photosensitive sheet is adapted to be exposed. A funnel member 26, comprising two pieces of web material connected along three sides, is joined along its fourth side to the leading end of each film member with the interface between funnel member layers in communication with the interface between the two sheets of the film member. Each of the funnel members, in turn, is provided with a pod 27 containing a fluid for developing the photosensitive element.

After a film unit has been exposed, a pulling leader or tab 28 attached to one of the units is employed to pull that unit between two opposed pressure applying members generally in the camera and as will be described more fully below. This causes the pod to rupture and the processing fluid to be squeezed or spread from the pod and through the funnel member so that the fluid enters between the two sheets of the film member and is distributed uniformly between those sheets as the latter are withdrawn between the same pressure applying members. At its trailing end, each film member also is provided with a trap or excess fluid collector 29 to be described more fully hereafter, for absorbing excess processing fluid not needed to fill the predetermined space between the sheets. As is evident from FIGS. 2, 5 and 6 each individual film unit is substantially thicker at its ends, because of these processing fluid pods and fluid collecting traps, than at any other point along the central portion of the unit.

The trailing end of all but the rearwardmost film member is connected to a corresponding trailing strip 30, each of which, in turn, is joined to the leading end of the pulling leader of the next subsequent film unit in the assemblage. The leading end of the pulling leader of the forwardmost film unit similarly is, joined to an opaque paper mask strip 31 which initially covers the exposure window in the magazine casing and which projects beyond the casing through an elongate slot 32 in the end wall magazine compartment 21. As is more fully described in commonly assigned U.S. application Ser. No. 77,474, entitled FILM ASSEMBLAGE, and filed in the name of Hubert Nerwin on even date herewith, the connections between the pulling leaders and the mask strip and trailing strips are adapted to separate when each successive pulling leader has been withdrawn to an accessible position by the withdrawal of the preceding mask strip or the preceding film unit.

Referring now more specifically to FIG. 5 and to a preferred embodiment of the nesting fluid traps in accordance with the present invention, each trap is defined by a single continuous sheet of relatively thin material 50 molded, pressed or otherwise formed with elongated indentations, such as ridges or rails 52 for determining the trap thickness and for providing nestable lines of contour that define cavities or chambers 54 on one side of the sheet that are adapted to receive a quantity of excess processing fluid. In order to direct the fluid into the cavities 54 and thereafter to contain the fluid in the chambers, a portion of the leader 28 is arranged in the assemblage or pack to extend beyond and under the trap when the unit is pulled from the camera. Prior to withdrawal of the units, however, the leader is folded upon itself in the manner illustrated most clearly in FIG. 2, such that the leader will not extend beneath the traps and the traps can nest to provide a thinner overall configuration.

In another embodiment illustrated most clearly in FIG. 6, the trap ridges or corrugations terminate prior to the trailing end of the trap sheet at locations spaced from said trailing end by different distances in a longitudinal direction. Such a structure has the advantages of being more crush resistant and of providing a more completely enclosed chamber for the excess fluid, while still permitting nesting of the units.

When the film assemblage is loaded into the magazine casing 12, which is obviously provided with a removable wall member for assembly purposes, the central image receiving portions of the four stacked film members and the adjacent portion of the masking sheet are received in the central magazine compartment 23 behind exposure window 16 and are biased forwardly by a pressure plate 33 under the influence of a leaf spring 34 (See FIG. 3). To accommodate the additional thickness of the processing-fluid pods, those elements are freely received in the respective end compartment 21 of the casing at one end of front wall member 14. The additional thickness of the traps, on the other hand, is accommodated in the opposite end of the cartridge without an increase in thickness, because of the nesting of the traps when in stacked relation.

To load the film pack or cartridge into the camera 35, shown in FIGS. 3 and 4, the camera cover door 36 is opened and the magazine is installed in chamber 37 in the camera body member 38. Lip 17 surrounding the cartridge exposure window is received in a continuous mating body-member groove 39 to provide a light-tight seal between the interior of the cartridge and the camera bellows 40. The bellows of the illustrative camera is of the type disclosed in commonly assigned copending U.S. Patent application Ser. No. 33,679, filed in the name of D. M. Harvey on May 1, 1970, and comprises a plurality of telescoping light-tight bellows sections 41. As also is disclosed in that same U.S. patent application, a pair of opposed support linkage assemblies, partially shown at 42 in FIG. 3, are enclosed within the bellows and are adapted to support the camera lens and shutter assembly 43 in the extended position shown in FIG. 3. When the camera cover door is closed and latched by appropriate latch means, not shown, it engages the back wall member of the magazine and holds the latter against the rearwardly facing body member surface adjacent light-sealing groove 39, thereby positioning the magazine in fixed relation to the extended camera lens. Additionally, closing the cover door moves a rotatable pressure roller 44 mounted thereon into opposed alignment with an arcuate pressure surface 45 of the camera body member at the opposite side of the leading end of the mask strip, which projects from the camera through opening 46.

After the camera has been loaded, the photographer grasps the accessible end of the mask strip and pulls it away from the camera. Accordingly, the leading end of the pulling leader of the forwardmost film unit is withdrawn between the opposed pressure members and through opening 46. When all of the available slack in that pulling leader has been absorbed, however, the strength of the joint between the mask strip and that leader is insufficient to move the corresponding film unit, which is temporarily held in place both by friction and also because the pressure plate must be displaced slightly against the resistance of spring 34 to allow the collector trap of that film member to enter the central cartridge compartment. Consequently, the pulling leader separates from the mask strip as the photographer continues to pull the latter completely out of the camera. With the mask strip removed, pressure plate 33 biases the film members forward so that the marginal region surrounding the exposure area of the forwardmost film member bears against the inner surface of the central wall member surrounding the exposure window; thus locating the film emulsion surface in coincidence with a focal plane of the camera lens system. After the forwardmost film member has been exposed, its pulling leader is withdrawn in the same manner to effect processing of that film member as it is removed from the camera. As each film member is thus removed from the camera, it brings the pulling leader and the next film member into accessible position; thereby allowing the same process to be repeated until all of the available film members have been exposed and processed.

Since the central cartridge portion is recessed and extends forward where it engages the camera, the excess thickness of the pod end portion of the film units can be supported forwardly of the focal plane, and the camera can be shorter in its overall thickness or forward-to-rearward dimension, even with its lens extended, than would be possible if it were loaded with a conventional rectangular cartridge of uniform thickness throughout. Even more significant, however, is the fact that when the camera is closed, as shown in FIG. 4, both the lens and shutter assembly 43 and the collapsed bellows sections 41 received in body member recess 47 are partially located between the end compartments of the cartridge.

In view of the above description, it should be apparent that an improved and more compact film cartridge and pack has been provided especially adapted for integral self-developing film units having enlarged end portions because of fluid pods, traps or the like, and which will accommodate such units in a more efficient manner than previously known, while at the same time accommodating a leader system for transporting the units from the cartridge. A compact camera also has been provided for use with the cartridge and which, at least in its ultimate form, can be folded to a thickness less than the combined thickness of the cartridge and camera objective and shutter at their thickest points. Other advantages and features have been set forth above and, in view of the above, will be apparent to those skilled in the art.

We claim:

1. A film pack comprising a plurality of self-processing film units, each film unit having a pod containing processing fluid, a photosensitive portion of a first predetermined thickness and a trailing end portion comprising a continuous relatively thin sheet member, said sheet member being indented to produce a plurality of alternating ridges and chambers conjointly forming a fluid collecting trap whose thickness is greater than said first thickness, said indented sheet members of adjacent film units, when said film units are arranged in superposed relationship, having the ridges and chambers of adjacent sheet members in nesting engagement whereby the overall thickness of the nested trailing ends of said film units is less than the total thickness of the unnested indented sheet members.

2. The invention according to claim 1 wherein each film unit also includes a leader sheet extending the length of the photosensitive portion and being folded back under the photosensitive portion at the juncture between the trap and the photosensitive portion to permit nesting of said superposed sheet members, said leader sheet arranged to be extended under said sheet member as the film unit is removed from said film pack to form one side of the trap.

3. The invention according to claim 1 wherein said ridges and chambers extend substantially longitudinally of said film unit whereby said chambers are in communication with the trailing end of said photosensitive portion.

4. A film pack comprising at least one integral self-processing film unit having a leading end and a trailing end, a pod of processing fluid at the leading end, a fluid collecting trap at the trailing end, and a photosensitive element therebetween, said photosensitive element having a first predetermined thickness, said trap comprising a continuous relatively thin sheet member, said sheet member being indented from the plane of the sheet member to produce a plurality of alternating ridges and chambers whose thickness is greater than said first thickness, said ridges and chambers extending substantially longitudinally of said film unit with said chambers in communication with said photosensitive element, and a leader sheet arranged to extend the length of the photosensitive element and being folded back under the photosensitive element at the juncture between the trap and the photosensitive element, said leader sheet arranged to be moved under said sheet member to form a side of the trap.

* * * * *